US011162031B2

(12) United States Patent
Peri et al.

(10) Patent No.: US 11,162,031 B2
(45) Date of Patent: Nov. 2, 2021

(54) METHOD FOR THE PYROLYSIS OF RAW MATERIALS, IN PARTICULAR RAW MATERIALS DERIVING FROM TIRES OR BITUMEN AND PYROLYSIS EQUIPMENT OPERATING ACCORDING TO SAID METHOD

(71) Applicants: Universitá degli Studi di Bergamo, Bergamo (IT); Paolo Peri, Brembate di Sopra (IT)

(72) Inventors: Paolo Peri, Brembate di Sopra (IT); Davide Russo, Florence (IT); Christian Spreafico, Dalmine (IT); Riccardo Degl'Innocenti, Lancaster (GB)

(73) Assignee: Paolo Peri, Brembate di Sopra (IT)

( * ) Notice: Subject to any disclaimer, the term of this patent is extended or adjusted under 35 U.S.C. 154(b) by 0 days.

(21) Appl. No.: 15/733,486

(22) PCT Filed: Feb. 14, 2019

(86) PCT No.: PCT/IB2019/051182
§ 371 (c)(1),
(2) Date: Aug. 7, 2020

(87) PCT Pub. No.: WO2019/159088
PCT Pub. Date: Aug. 22, 2019

(65) Prior Publication Data
US 2021/0102123 A1 Apr. 8, 2021

(51) Int. Cl.
*C10B 53/06* (2006.01)
*C10B 19/00* (2006.01)
(Continued)

(52) U.S. Cl.
CPC .............. *C10B 19/00* (2013.01); *B23K 26/08* (2013.01); *B23K 26/083* (2013.01);
(Continued)

(58) Field of Classification Search
CPC ......... C10B 19/00; C10B 53/06; C10B 53/07; C10L 5/447; B23K 26/08; B23K 26/083;
(Continued)

(56) References Cited

U.S. PATENT DOCUMENTS 3,652,447 A * 3/1972 Yant ......................... C10G 1/02
208/402
4,118,282 A 10/1978 Wallace
(Continued)

FOREIGN PATENT DOCUMENTS

WO 2017039477 3/2017

*Primary Examiner* — Jonathan Luke Pilcher
(74) *Attorney, Agent, or Firm* — Themis Law (57) ABSTRACT

A method for the pyrolysis of raw materials, especially raw materials deriving from tires or bitumen, includes the steps of feeding the material to be subjected to the pyrolysis process to a reactor; heating the material in the reactor at a temperature needed to establish the pyrolysis process; collecting the final products of the pyrolysis reaction; separating the gaseous, liquid and solid phases of the reaction products; and storing, for further treatment, the reaction products separate one from another. The heating in the pyrolysis process to the activation temperature is obtained by irradiating the raw material with laser radiation, concentrated or focused on a localized area of a pre-established surface area on the mass of raw material of the focusing area, and progressively moved along the entire surface of the mass of raw material to activate the pyrolytic reaction on all the mass of raw material.

10 Claims, 4 Drawing Sheets

(51) Int. Cl.
*C10B 41/00* (2006.01)
*C10B 53/07* (2006.01)
*B23K 26/08* (2014.01)
*B23K 26/36* (2014.01)
*B23K 26/16* (2006.01)
*C10B 53/00* (2006.01)

(52) U.S. Cl.
CPC .......... *B23K 26/0869* (2013.01); *B23K 26/16* (2013.01); *B23K 26/36* (2013.01); *C10B 41/00* (2013.01); *C10B 53/00* (2013.01); *C10B 53/06* (2013.01); *C10B 53/07* (2013.01)

(58) Field of Classification Search
CPC  B23K 26/0853; B23K 26/0869; B23K 26/16; B23K 26/36
See application file for complete search history.

(56) References Cited

U.S. PATENT DOCUMENTS

| | | | | |
|---|---|---|---|---|
| 4,647,443 | A | * 3/1987 | Apffel | C10G 1/10 423/449.7 |
| 4,759,300 | A |   7/1988 | Hansen | |
| 5,204,517 | A | * 4/1993 | Cates | B44D 3/166 134/1 |
| 5,281,798 | A | * 1/1994 | Hamm | B08B 7/0035 250/205 |
| 5,430,207 | A |   7/1995 | Keck | |
| 5,613,509 | A | * 3/1997 | Kolb | B24C 1/003 134/1 |
| 10,440,830 | B2 | * 10/2019 | Yee | H05K 1/09 |
| 2016/0265159 | A1 |   9/2016 | Medoff | |
| 2017/0203384 | A1 | * 7/2017 | Zhao | B23K 26/083 |

* cited by examiner

| T[°C] | CH4 [%v] | H2 [%v] | CO [%v] | CO₂ [%v] | C₂H₆ [%v] | C₃H₈ [%v] | C₄H₁₀ [%w] | S [%w] | LHV [MJ/Kg] | % w |
|---|---|---|---|---|---|---|---|---|---|---|
| 500 | 39,1 | 23,7 | 21,6 | 12 | 1,7 | 1,5 | 0,5 | 3,36 | 25,80 | 14,9 |
| 600 | 31 | 27,1 | 30,9 | 7,9 | 2,4 | 0,6 | 0,2 | 2,20 | 24,90 | 18,2 |
| 700 | 28,8 | 52,5 | 16,5 | 1,8 | 0 | 0,3 | 0,1 | 1,62 | 36,70 | 24,7 | composition of the molecules constituting the Syngas ($CH_4$, $H_2$, CO, $CO_2$, etc.) and having Lower Heating Value (LHV) and moisture as a function of the reaction temperature.

Fig. 3

| Parameter | Unit | Car | Truck | OTR | Typical(*) |
|---|---|---|---|---|---|
| LHV | [MJ/kg_dry basis] | 33.8 | 36.7 | 34.18 | 33 - 35 |
| C | %_dry basis | 81.78 | 83.4 | 79.7 | 81.83 |
| H | %_dry basis | 7.2 | 7.6 | 7.2 | 7.1 |
| N | %_dry basis | 0.52 | 0.5 | 0.92 | 0.38 |
| S | %_dry basis | 1.94 | 1.99 | 1.82 | 1.53 |
| Cl | %_dry basis | 0.07 | 0.05 | <0.03 | <0.1 |
| Ash | %_dry basis | 10.11 | 5.1 | 9.3 | 7.1 |
| Moisture | %_total | 0.96 | 0.3 | 0.7 | < 1.0 | composition of the Syngas in terms of elements, ashes and moisture as a function of the type of tire used: Car, Truck or OTR.

Fig. 4

| Parameter | UdM | min | max |
|---|---|---|---|
| Flash Point | °C | 60 | 93 |
| Pour Point[1] | °C | - | 10 |
| LHV | KJ/Kg | 37000 | 39000 |
| Water | % w | - | - |
| C | % w | 81,8 | 85,8 |
| H | % w | 11,36 | 11,58 |
| N | % w | 1 | 1,7 |
| S | % w | 1,2 | 1,5 |

Liquid Oil (TAR)

Fig. 5

| PARAMETER | UdM | MIN | MAX |
|---|---|---|---|
| LHV | kJ/kg | 22000 | 25000 |
| Moisture | % w | 0 | 0 |
| C | % w | 65,49 | 74,76 |
| H | % w | 0,18 | 0,57 |
| N | % w | 0,2 | 0,37 |
| S | % w | 2,28 | 2,89 |
| ASHES | % w | 25,19 | 31,75 |
| Ashes analysis: | | | |
| Al | mg/kg | 4988 | 23323 |
| B | mg/kg | 12 | 63 |
| Ba | mg/kg | 42 | 413 |
| Ca | mg/kg | 23376 | 198659 |
| Cd | mg/kg | 9 | 35 |
| Cl | mg/kg | | |
| Co | mg/kg | 0 | 416 |
| Cr | mg/kg | 29 | 50 |
| Cu | mg/kg | 83 | 257 |
| Fe | mg/kg | 2703 | 5861 |
| Hg | mg/kg | | |
| K | mg/kg | 3859 | 5873 |
| Li | mg/kg | 0 | 0 |
| Mg | mg/kg | 1924 | 16133 |
| Mn | mg/kg | 41 | 108 |
| Mo | mg/kg | 3 | 6 |
| Na | mg/kg | 1987 | 6741 |
| Ni | mg/kg | 0 | 8 |
| P | mg/kg | 518 | 1390 |
| Pb | mg/kg | 124 | 864 |
| Si | mg/kg | 1474 | 7754 |
| Ti | mg/kg | 144 | 457 |
| V | mg/kg | 11 | 35 |
| Zn | mg/kg | 78756 | 156028 |
| IT (Initiale Deform. Temp.) | °C | | 1085 |

Solid (CHAR)

Fig. 6

METHOD FOR THE PYROLYSIS OF RAW MATERIALS, IN PARTICULAR RAW MATERIALS DERIVING FROM TIRES OR BITUMEN AND PYROLYSIS EQUIPMENT OPERATING ACCORDING TO SAID METHOD

Method for the pyrolysis of raw materials, in particular raw materials deriving from tires or bitumen and pyrolysis equipment operating according to said method.

Object of the present invention is a method for the pyrolysis of raw materials, in particular raw materials deriving from tires or bitumen, the method providing the steps of Feeding to a reactor the material to be subjected to the pyrolysis process; heating the reactor where required;

heating said material in said reactor at the temperatures needed for establishing the pyrolysis process;

collecting the final products of the pyrolysis reaction;

separating one from another the gaseous, liquid and solid phases of the reaction products and storing, for further treatment, said reaction products separated one from another.

Currently the pyrolysis processes on masses of material, such as bio-masses, wastes, among which there are also materials constituted by rubber or bituminous materials, are carried out by heating the mass to be subjected to the pyrolysis reaction by different techniques for transferring the thermal energy.

A widespread technique provides a carrier of thermal energy, which is pre-heated and thermally contacted with the material of the mass to be subjected to the pyrolysis reaction. Some widespread embodiments of such a technique provide the mass of the starting material to be heated thanks to heat carriers consisting of spherical, spheroidal or spherical-like bodies, which are subjected to heating in an oven to be brought to a pre-established working temperature. Subsequently said bodies are contacted with the mass to be treated in a reactor. In order to ensure an effective transfer of thermal energy from the carriers to the mass, it is preferable that the material to be treated is chopped to pre-established granulometry such that the contact among the mass of the material and the carriers allows high transfer flows of thermal energy from said carriers to said material to be obtained.

In this type of equipment, the treatment process provides the heating of the heat carrier, which normally is obtained by an oven;

the transport of the heat carrier, within a transport circuit;

the need to arrange specific inlets and outlets for the heat carrier in the reactor, which has to work in the absence of oxygen and in vacuum conditions;

the cleaning of the heat carrier getting dirty with the residues of the reaction ashes.

In the state of the art further alternative pyrolysis techniques exist, such as those using:

induction heating of a ferrous carrier that in turn heats the matter to be pyrolyzed;

microwave heating of the matter to be pyrolyzed;

heating of the matter to be pyrolyzed by a plasma torch;

heating by ablative effects, such as for example gasification by high speed bumps.

All of the known equipment despite being functionally satisfactory, has improvement possibilities which can concern, for some limitations to a different extent, both the process steps and the needed structures and designs of the equipment.

According to a first aspect, the invention aims to improve process efficiency, not only for what concerns triggering and maintaining the reaction, but also for what concerns simplifying the collecting and separating process of the various phases of the reaction products and, not the least, for what also concerns simplifying the equipment itself needed to implement the process.

According to a further aspect, the invention aims to make the equipment much more compact, allowing its stationary design and a mobile or transportable design thereof, for example integrable inside a container or the like.

Still according to an aspect, the invention wants to overcome the limits of known processes and equipment regarding the reaction control, allowing precise control of the transfer of thermal energy and consequently of the reaction temperature to be exerted.

In order to satisfy one or more of the preceding aspects, the invention refers to a method for the pyrolysis of raw materials, in particular raw materials deriving from tires or bitumen, the method providing the steps of Feeding to a reactor the material to be subjected to the pyrolysis process;

heating said material in said reactor at the temperatures needed for establishing the pyrolysis process;

collecting the final products of the pyrolysis reaction;

separating one from another the gaseous, liquid and solid phases of the reaction products and storing, for further treatment, said reaction products separated one from another, and wherein the heating of the pyrolysis process to the activation temperature is obtained by irradiation of the raw material with laser radiation, said laser radiation being concentrated or focused on a localized area of a pre-established surface area on the surface of the mass of raw material of the focusing area, being progressively moved along the entire surface of the mass of raw material by activating the pyrolytic reaction on all of said mass of raw material.

According to an embodiment, the area on which the laser radiation is projected, is kept stationary in a reaction station and the mass of raw material is passed with a pre-established translation speed in said reaction station.

Still according to an embodiment, the reaction temperature is such to transform the mass of raw material into a mixture of ablation gas containing the reaction products and these are drawn by suctioning them from the reaction station in a drawing room open towards the reaction station and set at a pressure lower than that of the reaction station.

Still according to an embodiment provided in combination with one or more of the preceding embodiments, the separation of the reaction products having the different gaseous, liquid and solid phases, takes place by condensation of the mixture of ablation gas by means of a cooling step of said gas mixture at a pre-established temperature.

An embodiment variation can provide a step of pre-heating the raw material to an initial temperature lower than the reaction temperature by different factors.

The reaction temperature is in the order of magnitude from 420 to 950° C., depending on the type of material and anyway preferably about 600° C., whereas when a pre-heating is provided, the pre-heating temperature of the raw material can be in the order of magnitude of about 45° C. to 200° C., preferably about 150° C.

Still according to a possible embodiment variation, it is possible to feed an auxiliary gas in the drawing room, in the flow of the mixture of ablation gas.

A possible embodiment variation provides for the raw material being in the form of whole pieces of products or objects, or else being preliminarily treated for example by destructuring processes, such as dismemberment, separation of materials, delamination and/or cuts in smaller parts and/or shredding of the raw material to pre-established granulometry.

It is possible to use different types of lasers, depending on energy requirements to heat the raw material to the activation temperature of the pyrolysis reaction.

Typically the energies needed to activate such a reaction are in the order of magnitude of some hundreds Watt/cm$^2$ at most, on average about 100 W/cm$^2$ at most.

To supply these energies to the matter various types of lasers are advantageous, among which the diode laser and in particular the laser of the VCSEL type and solid state laser. The wavelengths of the interesting radiation comprise lasers having wavelength variable between 600 and 1100 nm. Although it is less efficient, another laser very much used in the industry that can be useful is the gas laser, and in particular $CO_2$ lasers emitting at about 10,000 nm.

An embodiment provides a method for producing gaseous, liquid and solid products obtained from the treatment by pyrolysis of a mass of raw material constituted by tires of vehicles such as for example cars, agricultural vehicles, cargo vehicles or vehicles of different type.

Thanks to the use of the laser for heating to the reaction activation temperature, the pyrolysis has lower emissions because the heat carrier requiring an oven for being heated is eliminated and thus the production of exhaust fumes from the oven is avoided.

The energy source is used directly without the aid of intermediate transformations and allows better yield indices. Furthermore, the direct heating allows a more controllable and controlled energy management.

The equipment is less complex as the part relating to the heating of the carriers and the part for the transfer of the carriers from the heating oven into the reactor, as well as the systems needed for cleaning the carriers from the reaction scraps, are missing.

In principle, the laser heating does not require preventive treatment of the raw material, such as for example the latter to be shredded to a pre-established granulometry. By providing a pre-established irradiation footprint and the translation thereof along a surface of the mass of raw material, it is also possible to treat whole parts without their breaking down into smaller parts.

The heating of the raw material by a laser also offers greater versatility as it can be used outside the reactor or inside it, but with lower volumetric impact. As it will be more clearly apparent below, an equipment design provides two distinct environments between the gas feeding and the storage one, which environments are communicated with each other by a suction channel.

A further embodiment of the method provides the step of maintaining the temperature of the reaction products constant at the value of the reaction temperature, since the ablation time until the separation step of the reaction products which have different phases.

This further step can be passive, i.e. for containing the dispersion of thermal energy, or else an active step supplying thermal energy to an extent which compensates the losses of thermal energy, or a combination of these steps.

A further characteristic further provides for using the same laser radiation used for the heating or a different laser source but having lower power and higher precision, in order to carry out real time measurements on the reaction products, that is during the reaction itself, and thus to allow having immediate feedback to adjust the irradiation energy.

According to a further aspect, object of the invention is a method for producing Syngas, TAR liquid reaction products and CHAR solid reaction products, the method providing the steps of:

subjecting to heating a mass of raw material constituted by whole tires or parts of tires, or by tire material shredded to a pre-established granulometry, said heating being carried out by irradiation with laser radiation having pre-established power on a surface of the mass of raw material, the thermal energy and/or the frequency of the laser radiation being calibrated so that to generate heating to a gasification temperature for the pyrolysis of the raw material;

drawing the gaseous reaction products by suction directly from the area wherein the reaction has been activated;

maintaining the temperature of the drawn gases until the treatment of separating the reaction products according to the various phases at their storage temperature, and separating the reaction products according to the various phases by cooling condensation of the gaseous reaction products drawn from the area wherein the reaction has been activated.

The typical compositions of a tire are reported in the following table 1:

| Material | Component name | Minimum content % | Maximum content % |
| --- | --- | --- | --- |
| Natural rubber | Rubber | 14 | 29 |
| Synthetic polymers | Isoprene; Styrene-Butadiene overall | 22 | 27 |
| Carbon black, soot | Grade N110 Grade N330 Grade N765 overall | 21 | 28 |
| Steel | | 10 | 16.5 |
| Fabric | | 5.5 | |
| Others | | 3 | 7.5 |
| Zinc oxide | | 1 | |
| Sulfur | | 1 | |

The products obtained from the pyrolysis reaction are a gaseous part (Syngas), a liquid part (TAR) and a solid part (CHAR).

The following table 2 summarizes the distribution of the reaction products, their compositions and their Lower Heating Value (LHV) as a function of the reaction temperature.

| T [° C.] | Type | Moisture | Ashes | C [% w] | H [% w] | N [% w] | S [% w] | % w | LHV [MJ/Kg] |
| --- | --- | --- | --- | --- | --- | --- | --- | --- | --- |
| 500 | Syngas | | | | | | 3.3 | 14.9 | 25.8 |
| | TAR | | | 82.6 | 11.9 | 0.89 | 0.97 | 46.3 | 38.4 |
| | CHAR | 0 | 25.2 | 74.7 | 0.31 | 0.26 | 2.74 | 38.8 | 25.2 |

-continued

| T [° C.] | Type | Moisture | Ashes | C [% w] | H [% w] | N [% w] | S [% w] | % w | LHV [MJ/Kg] |
|---|---|---|---|---|---|---|---|---|---|
| 600 | Syngas | | | | | | 2.19 | 18.2 | 24.9 |
| | TAR | | | 81.7 | 11.4 | 1.9 | 1.16 | 45.2 | 37.9 |
| | CHAR | 0 | 30.2 | 72.9 | 0.18 | 0.2 | 2.75 | 36.6 | 23.8 |
| 700 | Syngas | | | | | | 1.62 | 24.7 | 36.7 |
| | TAR | | | 81.7 | 11.4 | 1.18 | 1.54 | 36.2 | 39.2 |
| | CHAR | 0 | 25.2 | 73.8 | 0.2 | 0.2 | 2.69 | 39.1 | 25.2 |

Object of the invention is also a piece of equipment for the implementation of the above mentioned pyrolysis method, which equipment comprises:

a reaction station;

feeders of a mass of raw material;

a source transmitting thermal energy to the mass of raw material fed to the reaction station in order to induce a pyrolysis reaction in it;

a drawing member to draw the reaction products from said reaction station;

a separator of the reaction products having different phases in the conditions, in particular at room temperature;

According to the present invention, the source transmitting thermal energy to the mass of raw material is constituted by at least one laser source in combination with focusing/distributing means to focus/distribute the beam of the laser radiation on an irradiation surface of a pre-established size and smaller than the surface exposed to said radiation of the mass of raw material.

In an embodiment, the laser source and/or the raw material are supported by handling structures which generate a relative movement between the mass of raw material and the incidence area of the laser radiation, causing the movement of said incidence area along a surface exposed to the radiation of said mass of raw material.

An embodiment provides that the source(s) of laser radiation are stationary, whereas the mass of raw material is translated by a conveyor with respect to the incidence area of the laser radiation in the reaction station.

The incident energy on the mass of raw material in said distribution area of the laser radiation is determined to such an extent to cause an ablation of material through the gasification of the raw material. The gasified reaction products comprise the products in the gaseous phase and those in the liquid phase and are removed by suction from the reaction station by the drawing member of the reaction products.

The reaction products in the solid phase, the so-called CHAR, are not suctioned but they are extracted from the reaction station by the transport system feeding the mass of raw material in the reaction station.

An embodiment provides that the separation of the reaction products according to their own phases at room temperature and/or storage conditions, i.e. at a temperature lower than the reaction temperature, is carried out by means of a condenser cooling the gas fed by the drawing member at the liquefaction or solidification temperature of the different reaction products, whereby at the storage conditions the products in gaseous, solid and liquid phases are separated and can be stored separately.

According to an improvement of the present equipment, it is possible to provide a system to maintain the temperature stable in combination with the drawing member.

A first variation can only provide passive means to limit the heat dispersion. A second embodiment variation can provide a unit for generating thermal energy compensating the heat losses to maintain the temperature constant along the path of the reaction products through the drawing member from the reaction station to the separator.

A third embodiment variation can provide a combination of said first and second variations.

According to a further characteristic, it is possible to provide one or more drawing members, one or more of the same being designed so that to draw the reaction products in the gaseous (syngas) and/or solid (char) and/or liquid forms after the condensation step. Their design can take account of draw times, draw temperatures and draw modes.

According to an embodiment, downstream of a suction orifice of the reaction products in gasified form from the reaction station, a feed branch of an auxiliary gas is provided.

Such an auxiliary gas also has the function of enriching the Syngas produced by the reaction in a following step.

When an inert fluid is selected as the auxiliary gas or fluid, said fluid also has the function of protecting the lens of the source of laser radiation.

The design of the equipment according to one or more of the characteristics described above, provided in any combination thereof, allows having the following advantages:

The ablation area is subjected to the depression condition for the suction of the gaseous reaction products, without necessarily requiring the same extent of vacuum over all the feeding environment;

The area to be treated, that is the incidence area of the laser radiation on which the radiation emitted by the laser is distributed, is not of many $cm^2$ (if compared to the treatment area of the equipment using heat carriers such as beads or the like, which at present is as big as the whole reactor (15 square meters)), such a reaction area is very small in size. Thus the laser allows a local treatment of a very small area and the created gases are simultaneously transferred to the ablation.

The heating to the reaction temperature of the raw material is only carried out where needed, i.e. the part of rubber that is about to be treated.

By carrying out the ablation, the suctioned gas can easily be maintained at the reaction temperature also during the passage from the reaction station to the separator. Here it is stored and cooled to extract the liquid part (oil) from the gas and possibly the solid part (char) that has come in the suction flow together with the gas.

Thanks to this design the separation area of the products occurs in a different area than the reaction one.

The final products are only obtained by condensation, as all of the material related to the gaseous phase and the liquid phase is brought to the reaction temperature (at 600 degrees) and then cooled to separate the reaction products in the gaseous phase and those in the liquid phase.

In the most widespread design of the state of the art with heat carriers such as beads or the like fed to a reactor together with the reacting raw material, when the beads are hot only gas is created instead, whereas as they pass through the reactor they cool down and the reaction temperature with the rubber is lowered down to reactions at less than 450 degrees. In these thermal conditions, oil is immediately formed but remains mixed with the char, whereby it is necessary to separate CHAR from the oil. This activity is more complex than that of separating the ash from a gas. As it appears from the foregoing, the design according to the invention allows a process up to the separator, wherein the temperature of the drawn reaction products can always be maintained above the critical point of TAR. This critical point is depending on the composition of the raw material and on the specific application of the rubber or bitumen composition, is usually above 250. According to an embodiment variation, industrially, for safety reasons, there is the attempt of maintaining the temperature around 450° C., i.e. at least above 250 degrees C. and however the structure of the equipment allows a temperature control much easier and precise than the methods and equipment according to the state of the art.

According to a further improvement, the equipment according to one or more of the preceding exemplary embodiments or one or more of the preceding variations provides an inlet into the drawing member to feed an auxiliary gas and a feeder of said auxiliary gas connected to said inlet and to a tank or source of auxiliary gas.

Still according to an improvement that can be provided in combination with one or more of any of the preceding embodiments and/or embodiment variations, it is possible to provide a controlling system of the type and concentration of the reaction products, which provides detectors of presence of said products and measurement sensors of the concentration of said products.

To carry out said measurements, an embodiment variation provides for using the same heating laser radiation or laser instruments of lower power but higher precision, measurement sensors of the absorption spectrum of said radiation passed through the gas containing the reaction products being provided and of the numeric evaluation of the absorption peaks of determined characteristic frequencies of different reaction products from which concentration values have to be extracted, at least related to one type of reaction product with respect to other types.

According to a further characteristic, different types of sources are possible as sources of laser radiation, which can also vary depending on the type of raw materials to be treated.

The types of diode lasers and solid state lasers are particularly suitable, also with reference to a specific application wherein the raw material is constituted by tires of vehicles, such as cars, agricultural vehicles, cargo vehicles and others. In particular a laser type can consist of the so-called VCSEL (Vertical Cavity Surface Emitting Laser). A type of laser that is less suitable, but however compatible, consists of gas $CO_2$ lasers.

For what concerns the power of the preferred emitted radiation and radiation frequencies, the characteristics already explained above regarding the method apply.

Further improvements are object of the dependent claims.

The characteristics described above and other characteristics, with the related advantages of the present invention, will be clearer from the following description of some exemplary embodiments depicted in the attached drawings wherein.

Figure 1:
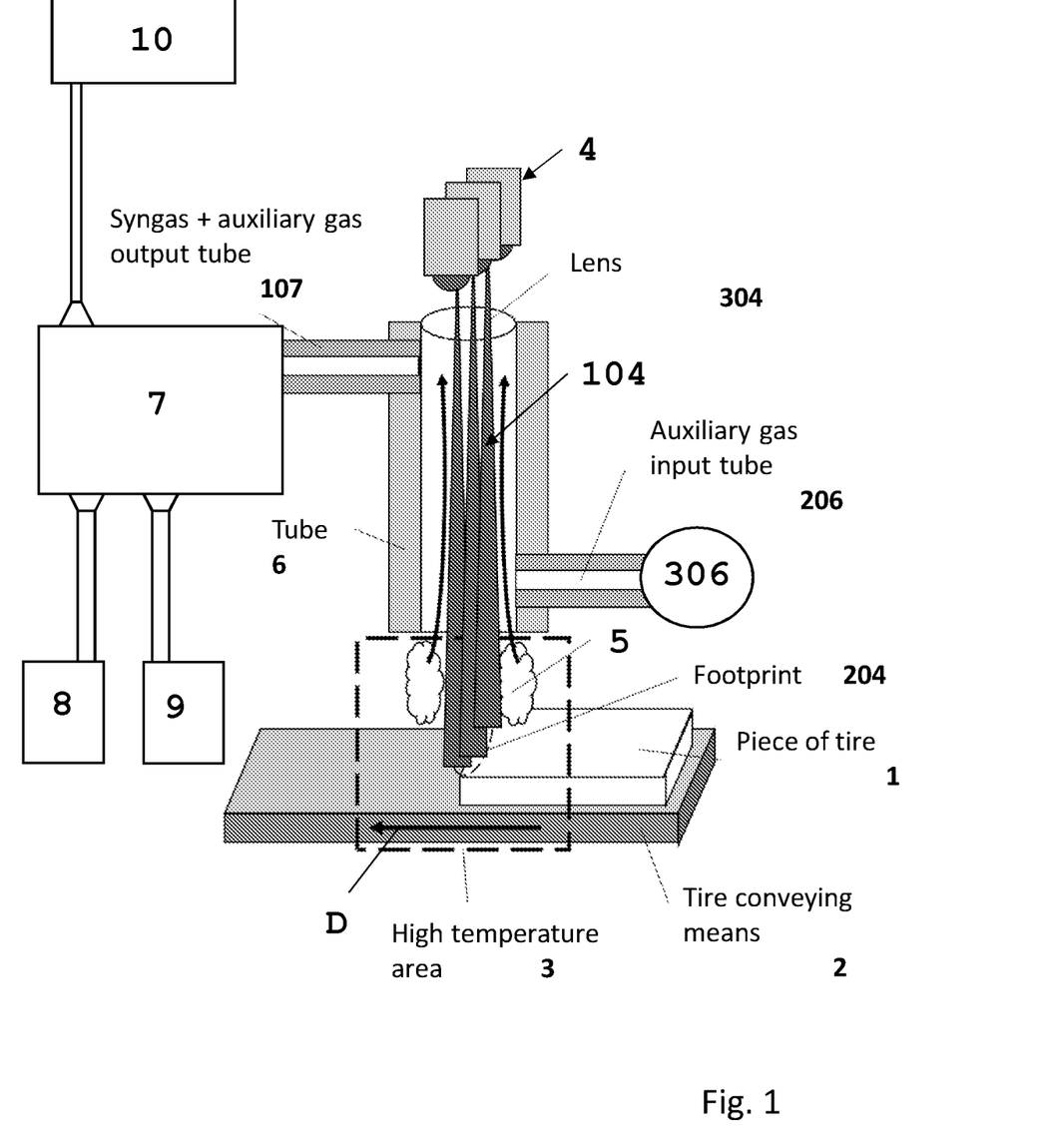
FIG. 1 shows a schematic view of an exemplary embodiment of a piece of equipment for the treatment of raw material, in particular raw material such as waste and especially raw material constituted by vehicle tires.

With reference to FIG. 1, the latter shows a schematic example based on which the possible variations will be depicted and will be clear to the technician of the art, if referred as differences or variations of the example depicted.

The depicted example is referring to a specific application wherein the raw material to be subjected to the pyrolysis reaction is constituted by vehicle tires or similar materials.

The raw material to be subjected to the pyrolysis reaction is denoted with 1 and is transported by a conveyor 2 to a reaction station 3, wherein an area at high temperature is generated by the irradiation of the raw material with the laser radiation 104 generated by a laser source 4 or a combination of more than one laser source 4.

The radiation 104 is distributed on the raw material 1 so as to generate an incidence area of said radiation 104, also called footprint, wherein the radiation 104 is distributed so as to heat the raw material coincident with said footprint 204 to the expected reaction temperature. At this reaction temperature the pyrolysis reaction is activated and part of the material the raw material is constituted by, is gasified as depicted by 5.

In some configurations and for some laser types, a lens 304 or a device forming the radiation beam 104 can be provided and is depicted by 304.

The reaction products in the gaseous form 5 are separated from other materials remaining on the conveyor 2 which are brought, as the raw material is moved forward in the reaction station, to an unloading station and drawn for a further treatment, not specified because it is not an object of the present invention.

The gasified reaction products 5 are drawn in different ways. A preferred embodiment provides for the gas being suctioned thanks to a drawing tube 6, whose open end is provided as coincident with the reaction station and wherein depressurization is generated with respect to the external environment and/or the reaction station.

Thus the reaction products under the gaseous form are transferred from the feeding duct to a separation chamber 7, wherein the reaction products having different phases such as the gaseous phase, so-called Syngas, the liquid phase so-called TAR essentially constituted by oils and the solid phase so-called CHAR, are separated one from another.

The separation among products having different phases is carried out thanks to a condensation process obtained by cooling the reaction products still at the reaction temperature to a lower temperature, in particular to room temperature or a typical storage or usage temperature of these products.

Thus the phase separation allows the separated collection and separated storage of each reaction product having gaseous, liquid and solid phases, as depicted by the tanks or warehouses 8, 9, and 10.

In order to avoid the cooling of the gas produced in the reaction station and thus a separation of the various phases already along the path of the drawing tube 6 and feeding ducts towards the separation chamber 7, along said path passive and/or active devices could be provided for preserving the temperature of the gas produced in the reaction station.

Such passive devices can be constituted by a thermal insulation of the drawing tube 6 and feeding ducts 107 to the separation chamber 7. The active devices can be sources feeding thermal energy and configured so as to bring a contribution of thermal energy substantially corresponding to the dissipated heat and thus to compensate the heat losses of the gas passing through the drawing tube 6 towards the separation chamber 7.

Obviously the two types of devices can be present in combination. The specific selection of insulations and/or sources of thermal energy to maintain the gas temperature can fall on any known type and depends on the specific structure of the equipment, the heat losses to be compensated and other considerations of opportunities dictated by the conditions of the specific application. Such alternatives are part of the base knowledge of the technician of the art and their selection falls within the normal activities of equipment design.

According to a further characteristic, a feed branch 206 of an auxiliary gas opens into the drawing tube 6 from a tank 306 of said gas. This gas can alternatively or in combination have different functions.

A first function is to enrich the Syngas so as to optimize the composition for its subsequent exploitation.

A second function is to protect the lenses 304 of the laser sources 4. In this case the auxiliary gas is constituted by, or comprises, an inert component.

A possible embodiment variation provides for insulating the reaction station from the environment, so that the reaction occurs in the absence of oxygen.

Also in this case, the technician of the art is able to configure a chamber enclosing the reaction station and allowing the raw material to be fed and the residual material of the pyrolysis reaction to be unloaded, so as to avoid ambient air and thus oxygen to pass in said chamber, since in the state of the art there are a number of solutions among which the technician of the art can choose depending on the raw material which is treated and other specificities of the different cases of use.

The depicted example shows a design wherein the drawing tube 6 opens into the reaction station and the laser radiation 104 is transmitted through said drawing tube 6 substantially coaxially or parallel to the axis of the same.

Such a solution allows also the radiation to be used as a source to maintain stable the temperature of the gas containing the reaction products during the path in the drawing tube 6.

Different alternatives are possible, one of which provides the laser source 4, both in the form of unique source and in the form of a combination of laser sources such as an array of laser diodes, being provided outside the drawing tube 6 and the radiation being transmitted to the footprint 204 on the raw material 1 passing through the reaction station from the outside of said tube.

In this case the optical axis of the radiation can be parallel to the axis of the drawing tube 6 or else it can be inclined with respect to the axis of the tube.

When a delimitation of the reaction station is provided in a reaction chamber, the source 4 or the combination of sources 4 can be provided outside or inside said reaction chamber.

Still according to an embodiment variation, instead of providing a conveyor 2 of the raw material to be pyrolyzed and instead of keeping stationary the footprint 204 generated by the laser radiation 104, it is possible to provide for moving said footprint 204 only, for example by translating the laser sources so as to move the footprint 204 on the surface of the mass of raw material 1, or else it is also possible to provide a combination of reciprocal movements of the raw material 1 and the footprint 2. Such a solution could for example provide a translation of the raw material 1 through the reaction station along a first direction, as depicted by the arrow D in FIG. 1, whereas the footprint is moved along the surface of the mass of raw material 1 in a direction perpendicular to the feed direction of the material 1 depicted by the arrow D. In this case, it could be a flow of raw material having width size, that is perpendicular to the feed direction, greater than the extent of the footprint 204 along said direction perpendicular to the feed direction of the mass of raw material 1.

The raw material 1 can be subjected to preventive mechanical machining reducing its dimensions and shape, such as for example the segmentation into parts and/or the separation of parts constituted by different materials, or else the shredding to pre-established granulometry.

Depending on the physical conditions of the raw material, it is possible to use different types of conveyors, such as linear belts, rotary augers, or the like. Such conveyors are known in the state of the art and the specific choice is a choice which is part of the design activities of the technician of the art and is based on the contingent conditions of the raw material.

For what concerns the drawing tube, this can be made as in FIG. 1, or else it can be in the form of helical tube wrapping itself around the beam of laser radiation 104. In this case more than one coaxial helical tube can also be provided. Also in this case, despite the laser radiation 104 is outside the drawing tube, it can interfere with the same at least in the peripheral area of the beam and can transfer thermal energy to the drawing tube to an extent sufficient to compensate for the heat losses and thus the temperature losses of the drawn gas.

In combination with an embodiment wherein the footprint 204 of the laser radiation on the surface of the material 1 is translated along said surface, it is also possible to provide for the moving of the drawing tube 6 along a path corresponding to that of said footprint 204.

For what concerns the type of lasers used, these can be selected depending on the raw material to be treated and the desired reaction temperatures in combination with the qualitative composition of the raw material.

When, as in the present application, you want to treat a raw material constituted by vehicle tires, it is substantially possible to provide three types of laser sources, which choice derives from the specific characteristics of this type of raw material.

A first relevant characteristic for the choice of the laser sources concerns the wavelength of the radiation, which is related to the generated thermal energy and the absorption effect of such energy by the raw material and thus the efficiency of the heating action of the raw material at the desired reaction temperature.

A first aspect of the specific raw material is that the material of which the vehicle tires are made of can be equated, to a first approximation, with a black body for what concerns the absorption and dissipation behaviors. In fact this material absorbs well the radiation of any wavelength and the heat dissipation by irradiation is low.

By analyzing the absorption spectra of the main components of a tire, it is possible to verify that the interest frequency range is from 400 nm (blue) to 2300 nm (medium infrared).

Based on these considerations, an embodiment provides for the possible wavelength being in the range between 600 nm and 1100 nm.

Among the existing laser sources, there are diode lasers and solid state lasers.

Such sources, if taken with power of at least 1 KW, are able to generate the power needed to heat the raw material to the expected reaction temperatures. This power is then translated on the material with a minimum of 100 W/cm$^2$.

A further embodiment is that with a wavelength around 10000 nm, covered by $CO_2$ gas laser that can even deposit this power with sources lower than one KW/cm$^2$.

An embodiment provides the use of a laser source or combinations of laser sources of the diode type and in particular of the type called VCSEL (Vertical Cavity Surface Emitting Laser).

With these sources it is possible to generate laser arrays that emit power even beyond 10 kW. The lasers of this type have small dimensions in the order of mm, at most some centimeter and thus the laser array doesn't get to very big dimensions negatively affecting the design of the equipment.

Despite this type of sources has a non-optimal laser beam, often a divergent one, they are extremely easy to be integrated in horizontal or vertical or customized arrays. That is so as to generate arrays having shapes ad lib, and which can be air or water cooled, or cooled by Peltier cooler systems.

A further type of lasers is that of the solid state lasers that however have a relatively high cost with respect to diode lasers.

Figure 2:
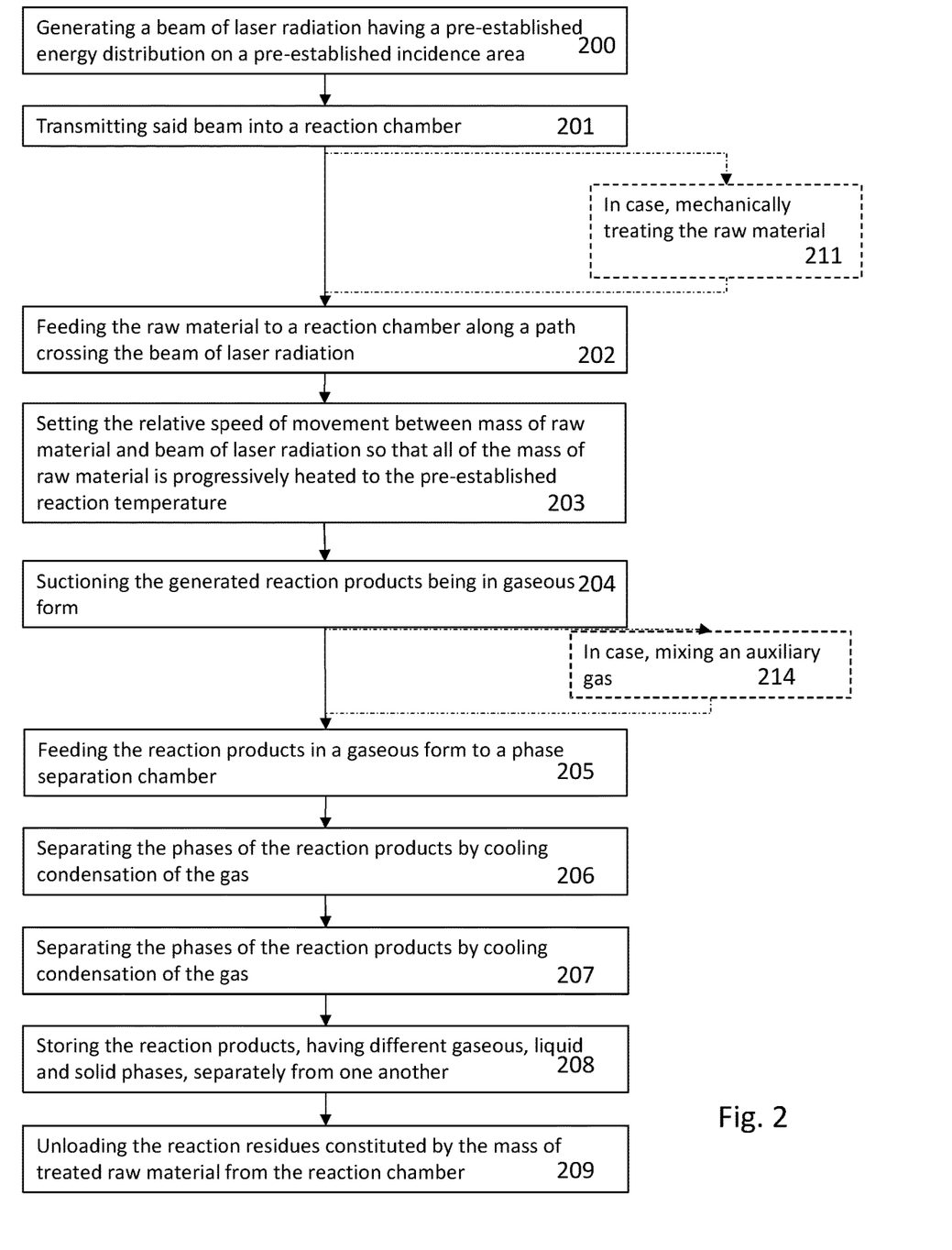
FIG. 2 shows a flow diagram of a treatment process of raw material implemented with the equipment of FIG. 1.

FIG. 2 shows an example of the main steps of the treatment method of a generic raw material to be subjected to pyrolysis reaction in order to generate reaction products.

At step 200 I generates a beam of laser radiation having pre-established energy density and pre-established wavelength, for example according to one or more of the variations described above and which laser beam is adapted to generate an incidence area of the radiation on a mass of raw material, in which air the energy of the radiation is substantially distributed homogeneously.

Being laser beams, said area forms a footprint substantially corresponding to the cross-section of the beam, i.e. the projection of the beam on a plane perpendicular to the optical axis propagating the radiation.

In this case the term substantially is referred to an approximation, as the beam of the radiation of a laser source or an array of laser sources is not always perfectly parallel but can have a certain opening, even if minimal, but whose effect depends on the distance of the surface against which the beam is projected by the source or array of sources.

The beam is transmitted to the step 201 into a reaction chamber wherein, at step 202, the mass of raw material is fed. The feed takes place along a relative movement path between the mass of raw material and the footprint of the radiation projected on the surface of the mass of raw material. This path is selected and defined so as to allow the entire exposed surface of the mass of raw material to be subjected to the action of the laser radiation and thus the pyrolytic reaction to be triggered.

The described relative movement can occur according to one or more of the variations described above with reference to FIG. 1.

Possibly, as depicted by 211, before feeding the raw material to the reaction chamber, the raw material is mechanically treated, for example reduced to pieces of pre-established size or else, depending on the composition and structure, dismembered in different parts, some of which are not suitable to the pyrolysis treatment or are treated differently according to their chemical composition.

At step 203, the path and speed of the relative movement between the footprint, i.e. irradiation area and mass of raw material, are set so that all of the mass of raw material is progressively led to the reaction temperature and for the time needed to the completion of said reaction in the area hit by the laser radiation.

Step 204 provides the suction of the reaction products. Such a suction takes place according to one or more of the previously described modes and collects all the reaction products in gaseous form, whereas the reaction residues remain on the conveyor.

Step 204 can be combined with step 214, which is optional, wherein to the reaction products in gaseous form an auxiliary gas or fluid are added that can be of the type according to one or more of the previously described variations.

At step 205 the reaction products are fed to a separation chamber of said products according to the various phases they take in a pre-established environmental condition, such as for example the storage condition or the usage condition or else the external environment condition.

At step 206 in the chamber said separation of the products in the single gaseous, liquid and solid phases takes place. Such separation takes place by cooling the reaction gas and by mechanically drawing the reaction products in the gaseous, liquid and solid phases and by storing them in dedicated warehouses, as depicted at step 207 and 208.

Similarly to step 209, the reaction residues remained on the conveyor are also themselves separately drawn and stored or sent to further treatment processes.

As already described before, the invention is also referring to a particular application for which the method and the described equipment are particularly suitable. This specific application concerns the treatment of waste materials and in particular vehicle tires of any type.

As already previously described, the tires have a complex structure containing materials adapted to take part to the pyrolytic reaction and others that remain excluded. The composition of the tire depends, to a first approximation, on the use, i.e. on the type of vehicle to which is intended to and, as depicted in table 1, the main organic materials in the tires are constituted by natural rubber, i.e. caoutchouc and synthetic polymers. Furthermore, another component being in considerable amount is the carbon black or soot. These three components form more than about half of the percentage of the raw material contained in the tires. The other components and their percent amounts are depicted in table 1.

Table 2 shows the composition of the generated reaction products and related to each of the three phases (liquid, solid and gaseous) depending on three different reaction temperatures.

With reference to the above mentioned application, the method and the equipment are designed so as to generate reaction temperatures, in the mass of raw material constituted by tires, in the order of 500° C. to 700° C. and preferably in the order of not less than 600° C.

According to an advantageous characteristic, as the characteristics of the raw material are substantially corresponding to those of a black body, as already previously set forth, the choice of the electromagnetic radiation and thus of the sources and power thereof is substantially limited to laser sources able to generate at least 100 W/cm² on the material to be pyrolyzed and with any wavelength.

A preferred frequency range essentially referring to the absorption spectrum of the main components of the tire as set forth above, provides for the wavelength of the electromagnetic radiation being in the range between 400 nm and 2300 nm, preferably between 600 and 1100 nm.

The measurements of the compositions of the reaction products for different conditions are depicted in the tables of FIGS. 3 to 6.

Figure 3:
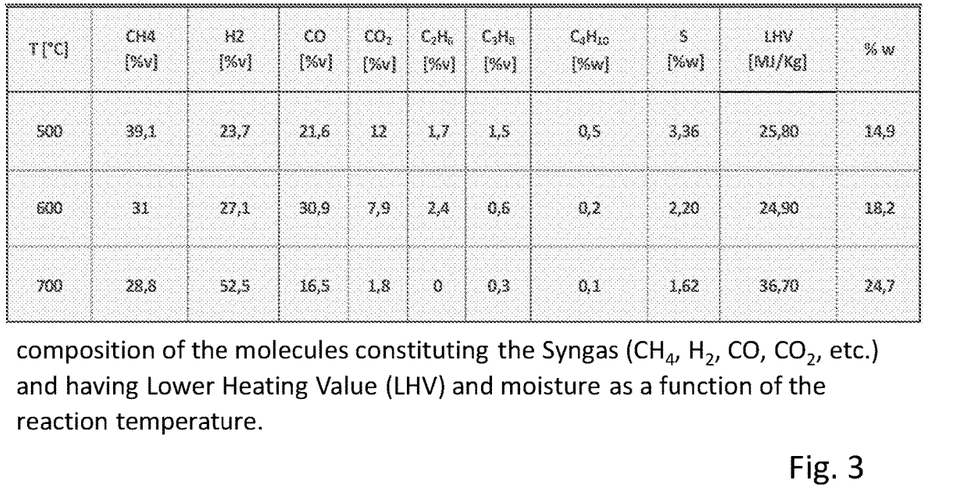
FIG. 3 shows a table summarizing the composition of the molecules constituting the Syngas ($CH_4$, $H_2$, CO, $CO_2$, etc.) obtained from the pyrolysis of vehicle tires and having a Lower Heating Value (LHV) and moisture as a function of the reaction temperature.

FIG. 3 shows the composition of the Syngas, i.e. the gaseous component of the reaction products which is obtained at the different reaction temperatures.

The Lower Heating Value of the Syngas and the moisture in the Syngas at the different reaction temperatures are also depicted.

Figure 4:
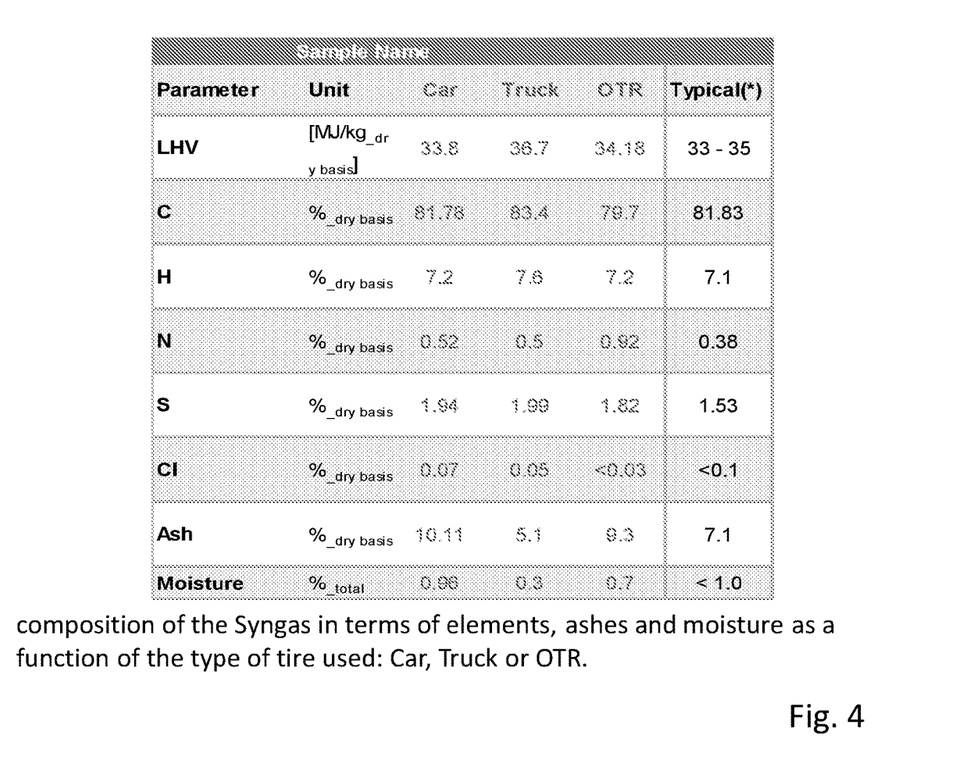
FIG. 4 shows the composition of the Syngas in terms of elements, ashes and moisture as a function of the type of tire used: Car, Truck or OTR.

The table of FIG. 4 shows the composition of the Syngas obtained as a function of the type of tire treated.

Figure 5:
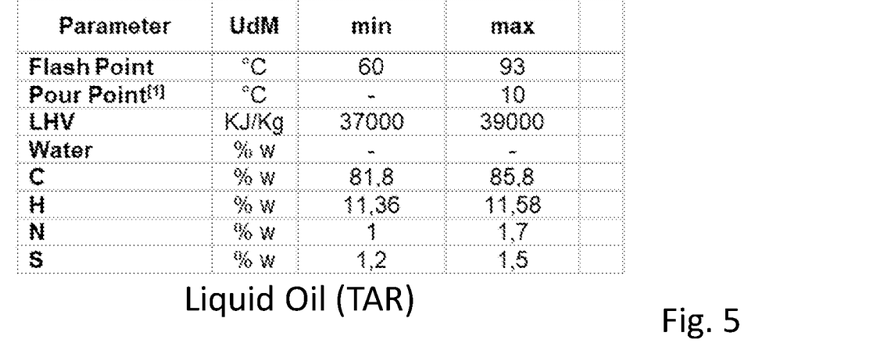
FIGS. 5 and 6 show the composition of the reaction products in the liquid phase (TAR) and in the solid phase (CHAR).
Figure 6:
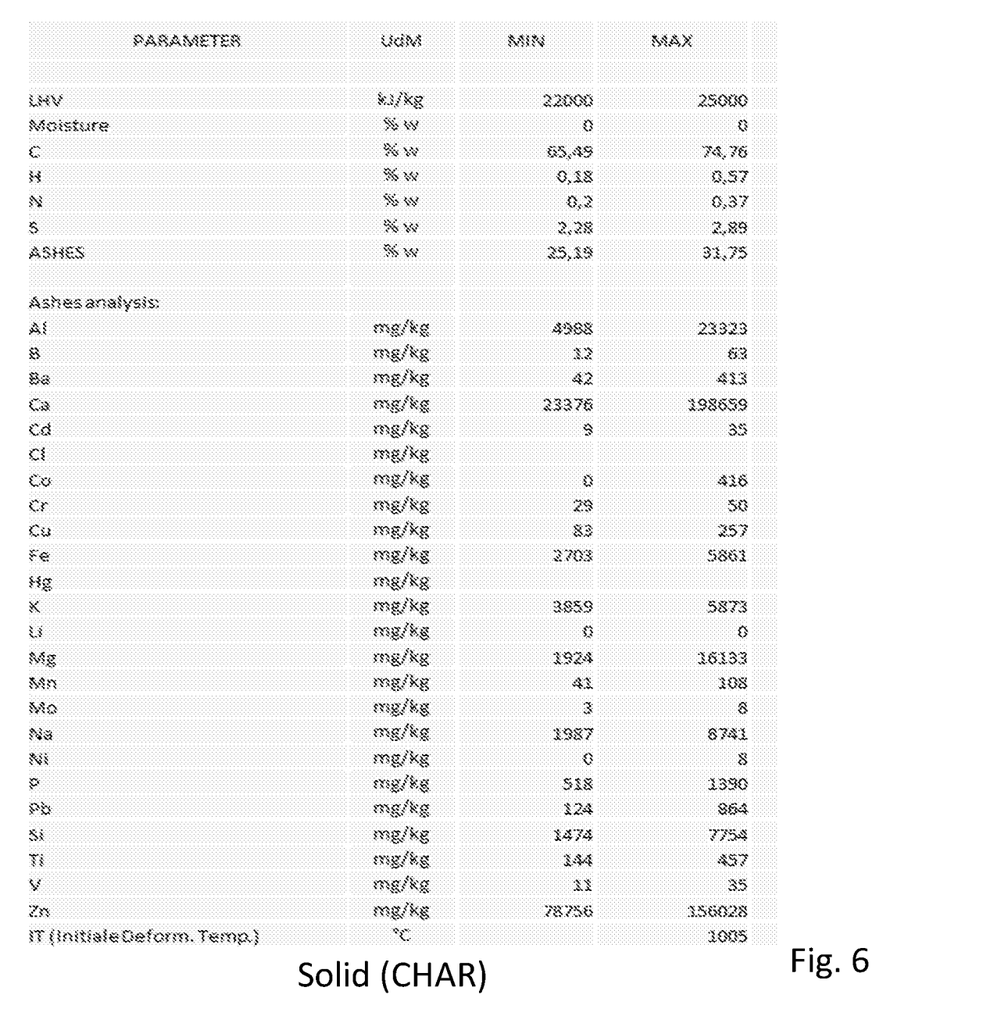

The tables of FIGS. 5 and 6 show the compositions of the liquid phase of the reaction products, which are substantially oils, and of the solid phase, which are substantially called TAR and CHAR.

From the tables depicted the effectiveness of the method according to the present invention and of the particular application to generate reaction products from the waste raw material having high energy value is evident.

FIG. 1
Tubo di uscita Syngas+gas ausiliario=Syngas+auxiliary gas output tube
Lente=Lens
Tubo di ingresso gas ausiliario=auxiliary gas input tube
Orma=Footprint
Pezzo di pneumatico=Piece of tire
Mezzo di trasporto del pneumatico=Tire conveying means
Zona ad alta temperatura=High temperature area
Tubo=Tube FIG. 2
200—Generating a beam of laser radiation having a pre-established energy distribution on a pre-established incidence area
201—Transmitting said beam into a reaction chamber
211—In case, mechanically treating the raw material
202—Feeding the raw material to a reaction chamber along a path crossing the beam of laser radiation
203—Setting the relative speed of movement between mass of raw material and beam of laser radiation so that all of the mass of raw material is progressively heated to the pre-established reaction temperature
204—Suctioning the generated reaction products being in gaseous form
214—In case, mixing an auxiliary gas
205—Feeding the reaction products in a gaseous form to a phase separation chamber
206—Separating the phases of the reaction products by cooling condensation of the gas
207—Separating the phases of the reaction products by cooling condensation of the gas
208—Storing the reaction products, having different gaseous, liquid and solid phases, separately from one another
209—Unloading the reaction residues constituted by the mass of treated raw material from the reaction chamber.

FIG. 3
composition of the molecules constituting the Syngas ($CH_4$, $H_2$, CO, $CO_2$, etc.) and having Lower Heating Value (LHV) and moisture as a function of the reaction temperature.

FIG. 4
composition of the Syngas in terms of elements, ashes and moisture as a function of the type of tire used: Car, Truck or OTR.

FIG. 5
Liquid Oil

FIG. 6
Solid

The invention claimed is:

1. A method of pyrolysis of raw materials, comprising the steps of:
feeding, to a reactor, a material to be subjected to a pyrolysis process;
heating said material in said reactor to a reaction temperature sufficient to establish a pyrolysis reaction;
collecting, and conveying to a separation chamber, a gaseous flow containing reaction products of the pyrolysis reaction;
separating one from another gaseous, liquid and solid phases of the reaction products and storing said reaction products separated one from another; and
collecting reaction residues from the reactor,
wherein:
heating to the reaction temperature and carrying out the pyrolysis process comprises irradiating the material with laser radiation only, and
said laser radiation is concentrated or focused on a localized area of a pre-established surface area of a mass of the material, said laser radiation being progressively moved along an entire single surface of the mass of the material to activate the pyrolysis reaction on all of said mass of the material.

2. The method according to claim 1, wherein the reaction temperature is such to transform the mass of the material into a mixture of ablation gas containing the reaction products the mixture being drawn by suctioning from a reaction station in the reactor, into a drawing tube set at a pressure lower than a pressure of the reaction station.

3. The method according to claim 2, wherein separating the reaction products comprises condensing the mixture of ablation gas with a step of cooling said mixture of ablation gas at a pre-established temperature.

4. The method according to claim 2, wherein the reaction temperature is from 420° C. to 950° C., further comprising a step of pre-heating the material, wherein a pre-heating temperature is from 45° C. to 200° C.

5. The method according to claim 2, further comprising feeding an auxiliary gas into the drawing tube, into a flow of reaction gas mixture.

6. The method according to claim 1, wherein the laser radiation has power of at least two hundred Watt/cm² and transfers on a piece to be pyrolyzed at least 100 W/cm², with wavelengths of the laser radiation that can range, when a diode or solid state laser is employed, from 600 to 1100 nm, or with a wavelength of 10000 nm when a $CO_2$ gas laser is employed.

7. The method according to claim 1, wherein the mass of the material to be treated by the pyrolysis process is constituted by tires of vehicles and/or bitumen and materials containing bitumen and waste or scraps having a composition that allows the pyrolysis reaction to be activated by using the laser radiation.

8. The method according to claim 1, further comprising a step of maintaining the reaction temperature constant until the reaction products are separated into the gaseous, liquid and solid phases.

9. The method according to claim 1, further comprising a step of taking real time measurements on the reaction products during the reaction, and generating immediate feedback adjusting irradiation energy by using the laser radiation or a laser radiation from another source to determine a concentration of the reaction products in gas generated by the pyrolysis reaction.

10. A method of producing Syngas, TAR liquid reaction products and CHAR solid reaction products, the method comprising:

feeding, to a reactor, a material to be subjected to a pyrolysis process;

heating said material in said reactor to a reaction temperature sufficient to establish a pyrolysis reaction;

collecting, and conveying to a separation chamber, a gaseous flow containing reaction products of the pyrolysis reaction;

separating one from another gaseous, liquid and solid phases of the reaction products and storing the reaction products separated one from another; and     collecting reaction residues from the reactor, wherein:

heating to the reaction temperature and carrying out the pyrolysis process comprises irradiating the material with laser radiation only, and said laser radiation is concentrated or focused on a localized area of a pre-established surface area of a mass of the material, said laser radiation being progressively moved along an entire single surface of the mass of the material to activate the pyrolysis reaction on all of said mass of the material.

* * * * *